United States Patent
Kim et al.

(10) Patent No.: US 8,441,998 B2
(45) Date of Patent: May 14, 2013

(54) METHOD OF TRANSMITTING BROADCAST INFORMATION IN MULTIPLE CARRIER SYSTEM

(75) Inventors: Eunkyung Kim, Seoul (KR); Juhee Kim, Daejeon-si (KR); Soojung Jung, Daejeon-si (KR); Jae Sun Cha, Daejeon-si (KR); Kwang Jae Lim, Daejeon-si (KR); Hyun Lee, Daejeon-si (KR); Chul Sik Yoon, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 399 days.

(21) Appl. No.: 12/830,804

(22) Filed: Jul. 6, 2010

(65) Prior Publication Data
US 2011/0032873 A1     Feb. 10, 2011

(30) Foreign Application Priority Data

Jul. 6, 2009 (KR) .................. 10-2009-0060983
Jul. 5, 2010 (KR) .................. 10-2010-0064227

(51) Int. Cl.
*H04W 4/00* (2009.01)
(52) U.S. Cl.
USPC ........................................................... 370/329
(58) Field of Classification Search ............ 370/328, 370/329
See application file for complete search history.

(56) References Cited

U.S. PATENT DOCUMENTS

| | | | |
|---|---|---|---|
| 6,751,472 B1 * | 6/2004 | Muhonen | 455/553.1 |
| 8,218,424 B2 * | 7/2012 | Ahmadi et al. | 370/208 |
| 2009/0274096 A1 | 11/2009 | Fu | |
| 2010/0157923 A1 * | 6/2010 | Jung et al. | 370/329 |
| 2010/0222060 A1 * | 9/2010 | Zhang et al. | 455/436 |
| 2010/0265847 A1 * | 10/2010 | Lee et al. | 370/254 |
| 2011/0159903 A1 * | 6/2011 | Yuk et al. | 455/507 |
| 2011/0194529 A1 * | 8/2011 | Cho et al. | 370/331 |
| 2012/0026958 A1 * | 2/2012 | Chou | 370/329 |
| 2012/0077486 A1 * | 3/2012 | Park et al. | 455/422.1 |

OTHER PUBLICATIONS

Wang, Xiaoyi; Proposed text from DL PHY Ctrl Drafting group for IEEE 802.16m Amendment; Mar. 12, 2009; IEEE.*

* cited by examiner

*Primary Examiner* — Mark Rinehart
*Assistant Examiner* — Christopher R Crompton
(74) *Attorney, Agent, or Firm* — Staas & Halsey LLP (57) ABSTRACT

A method of transmitting broadcast information by using multiple carriers is provided. The method includes: configuring a superframe for an operation of the multiple carriers; and transmitting the broadcast information through at least one primary carrier selected from the multiple carriers. Accordingly, the multiple carrier system can effectively manage respective carriers, and particularly can effectively use radio resources in transmission of broadcast information.

10 Claims, 7 Drawing Sheets

METHOD OF TRANSMITTING BROADCAST INFORMATION IN MULTIPLE CARRIER SYSTEM

CROSS-REFERENCE TO RELATED APPLICATIONS

This application claims the benefit of priority of Korean Patent Application No. 10-2009-0060983 filed on Jul. 6, 2009 and Korean Patent Application No. 10-2010-0064227 filed on Jul. 5, 2010, which are incorporated by reference in their entirety herein.

BACKGROUND

1. Field of the Invention

The present invention relates to wireless communications, and more particularly, to a method of selectively transmitting broadcast information in a multiple carrier system.

2. Related Art $3^{rd}$ generation partnership project (3GPP) long term evolution (LTE) and institute of electrical and electronics engineers (IEEE) 802.16m have been developed as candidates of a next generation wireless communication system. The 802.16m standard has two aspects. One aspect is that the 802.16m is an amendment of the existing 802.16e standard in terms of continuity from the past. The other aspect is that the 802.16m is a standard for an international mobile telecommunication (IMT)-advanced system of a next generation in terms of continuity to the future. Therefore, the 802.16m standard needs to satisfy all advanced requirements for the IMT-advanced system while maintaining compatibility with a mobile WiMAX system based on the 802.16e standard.

In general, a wireless communication system uses one bandwidth for data transmission. For example, a $2^{nd}$ generation wireless communication system uses a bandwidth of 200 KHz~1.25 MHz, and a $3^{rd}$ generation wireless communication system uses a bandwidth of 5 MHz~10 MHz. To support growing transmission capacity, the 3GPP LTE or the 802.16m has recently expanded its bandwidth to 20 MHz or higher. It may be necessary to increase the bandwidth to obtain high transmission capacity. However, if a large bandwidth is supported even when a service request level is low, it may cause significant power consumption.

Therefore, a multiple carrier system capable of transmitting and/or receiving broadband data by using a plurality of carriers has been introduced by defining a carrier having one bandwidth and, a center frequency. By using one or more carriers, a narrowband and a broadband are both supported. For example, if one carrier corresponds to a bandwidth of 5 MHz, four carriers are used to support a bandwidth of up to 20 MHz.

Broadcast information is information that must be received by all mobile stations according to a characteristic of the information. Therefore, the broadcast information has to be transmitted through all carriers in principle in case of using the multiple carrier system. However, if the broadcast information is transmitted for a case where there is no mobile station in a cell, or where the mobile station cannot enter the cell, or where a base station and the mobile station cannot communicate with each other through a specific carrier, a limited radio resource is wasted and system performance deteriorates. Accordingly, there is a need for a method capable of selectively transmitting the broadcast information in the multiple carrier system.

SUMMARY

The present invention provides a method of transmitting broadcast information capable of improving system performance by effectively using a limited radio resource in a multiple carrier system.

According to an aspect of the present invention, a method of transmitting broadcast information by using multiple carriers is provided. The method includes: configuring a superframe for an operation of the multiple carriers; and transmitting the broadcast information through at least one primary carrier selected from the multiple carriers. The superframe includes a primary superframe header (P-SFH) and a secondary superframe header (S-SFH). The S-SFH includes cell bar information indicating whether initial cell entry of a mobile station is allowed.

According to another aspect of the present invention, a method of transmitting broadcast information by using multiple carriers is provided. The method includes: determining a primary carrier for transmitting the broadcast information by using cell bar information; and transmitting the broadcast information through the determined primary carrier. The cell bar information is individually configured for each of the multiple carriers, and the cell bar information corresponding to the primary carrier indicates that initial cell entry is allowed.

Accordingly, the multiple carrier system can effectively manage respective carriers, and particularly can effectively use radio resources in transmission of broadcast information.

DESCRIPTION OF EXEMPLARY EMBODIMENTS

Figure 1:
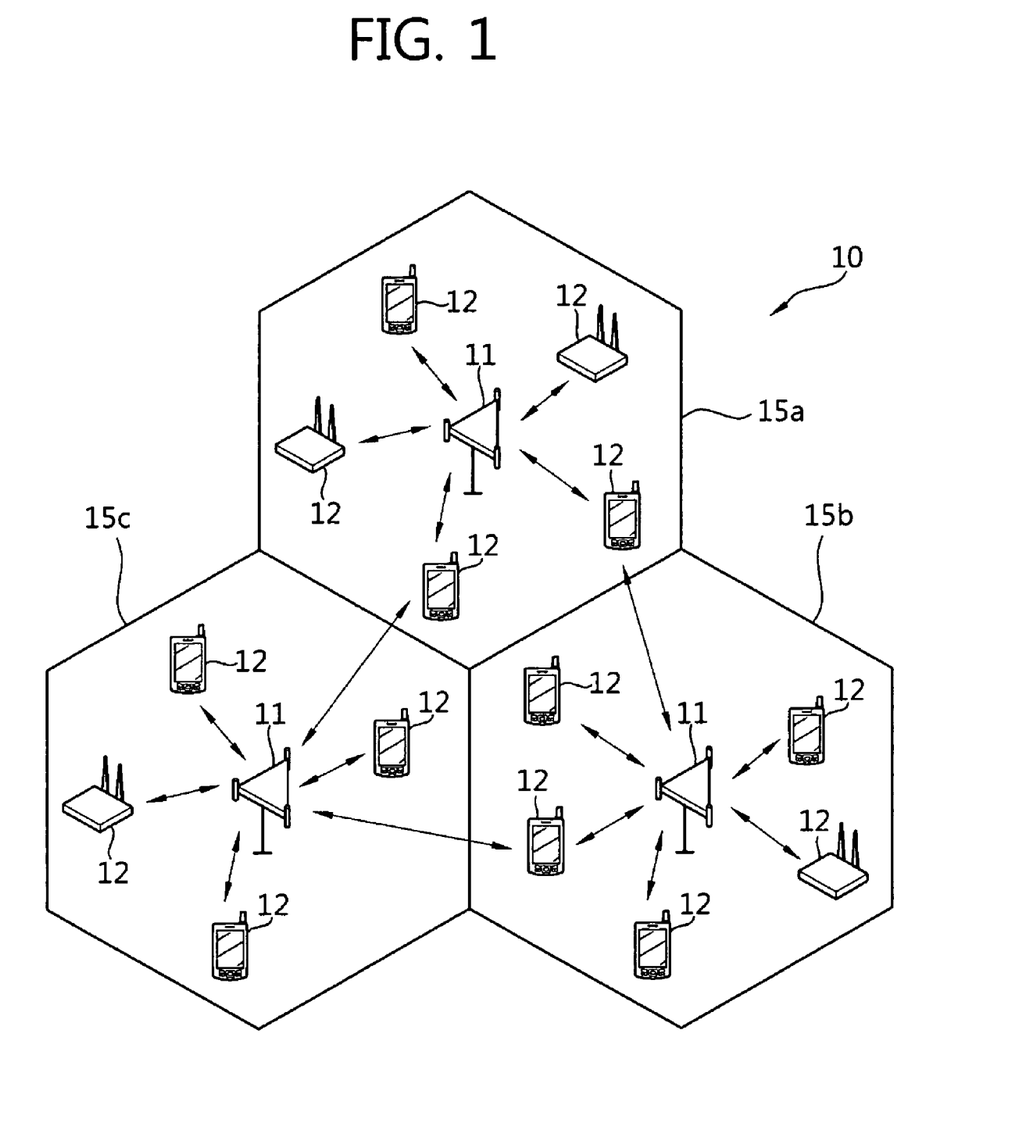
FIG. 1 shows a wireless communication system.

FIG. 1 shows a wireless communication system. A wireless communication system 10 includes at least one base station (BS) 11. Each BS 11 provides communication services to specific geographical regions (generally referred to as cells) 15a, 15b, and 15c. Each cell can be divided into a plurality of regions (referred to as sectors). A mobile station (MS) 12 may be fixed or mobile, and may be referred to as another terminology, such as a user equipment (UE), a mobile terminal (MT), a user terminal (UT), a subscriber station (SS), a wireless device, a personal digital assistant (PDA), a wireless modem, a handheld device, etc. The BS 11 is generally a fixed station that communicates with the MS 12 and may be referred to as another terminology, such as an evolved node-B (eNB), a base transceiver system (BTS), an access point, etc.

Hereinafter, a downlink denotes a communication link from the BS to the MS, and an uplink denotes a communication link from the MS to the BS. In the downlink, a transmitter may be a part of the BS, and a receiver may be a part of the MS. In the uplink, the transmitter may be a part of the MS, and the receiver may be a part of the BS.

Spectrum aggregation (also referred to as bandwidth aggregation or carrier aggregation) is for supporting a plurality of carriers. The carrier is defined with a bandwidth and a center frequency. The spectrum aggregation is introduced to support an increasing throughput, to prevent cost rising caused by introduction of a broadband radio frequency (RF) device, and to ensure compatibility with a legacy system. For example, when 5 carriers are assigned with a granularity of a carrier unit having a bandwidth of 5 MHz, up to 20 MHz can be supported.

The spectrum aggregation can be classified into contiguous spectrum aggregation achieved between consecutive carriers in a frequency domain and non-contiguous spectrum aggregation achieved between discontinuous carriers. The number of carriers aggregated in a downlink may be different from the number of carriers aggregated in an uplink. Symmetric aggregation is achieved when the number of downlink carriers is equal to the number of uplink carriers. Asymmetric aggregation is achieved when the number of downlink carriers is different from the number of uplink carriers. Carriers can be divided into fully configured carriers and partially configured carriers according to directivity of the carriers. The fully configured carriers are bidirectional carriers that can transmit and/or receive all control signals and data. The partially configured carriers are unidirectional carriers that can transmit only downlink data. The partially configured carriers may be mainly used in a multicast and broadcast service (MBS) and/or a single frequency network (SFN).

Multiple carriers may have different sizes (i.e., bandwidths). For example, when 5 carriers are used to configure a band of 70 MHz, the band can be configured as 5 MHz carrier (carrier #0)+20 MHz carrier (carrier #1)+20 MHz carrier (carrier #2)+20 MHz carrier (carrier #3)+5 MHz carrier (carrier #4).

Hereinafter, a multiple carrier system implies a system supporting multiple carriers on the basis of spectrum aggregation. The multiple carrier system can use contiguous spectrum aggregation and/or non-contiguous spectrum aggregation, and also can use either symmetric aggregation or asymmetric aggregation.

Figure 2:
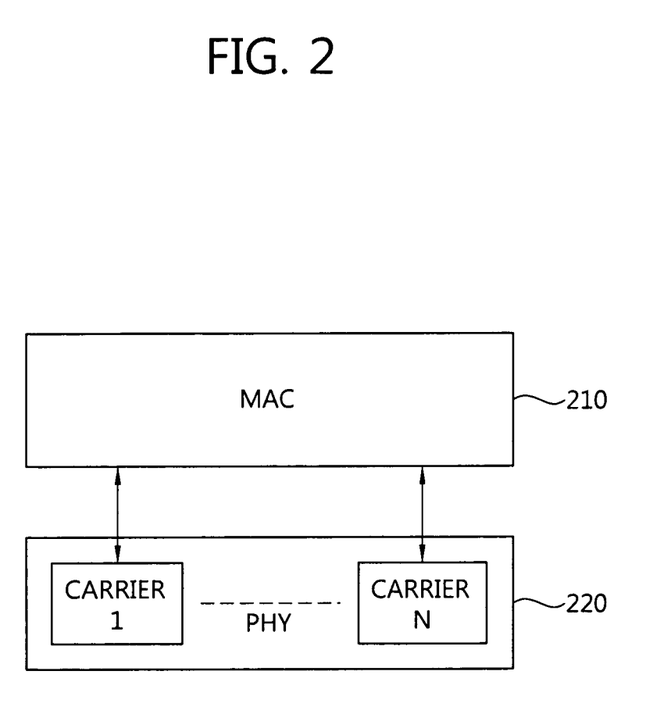
FIG. 2 shows an example of a protocol structure for supporting multiple carriers.

FIG. 2 shows an example of a protocol structure for supporting multiple carriers. A common medium access control (MAC) entity 210 manages a physical (PHY) layer 220 that uses a plurality of carriers. A MAC management message transmitted through a specific carrier can apply to another carrier. The PHY layer 220 can operate by using time division duplex (TDD) and/or frequency division duplex (FDD).

Figure 3:
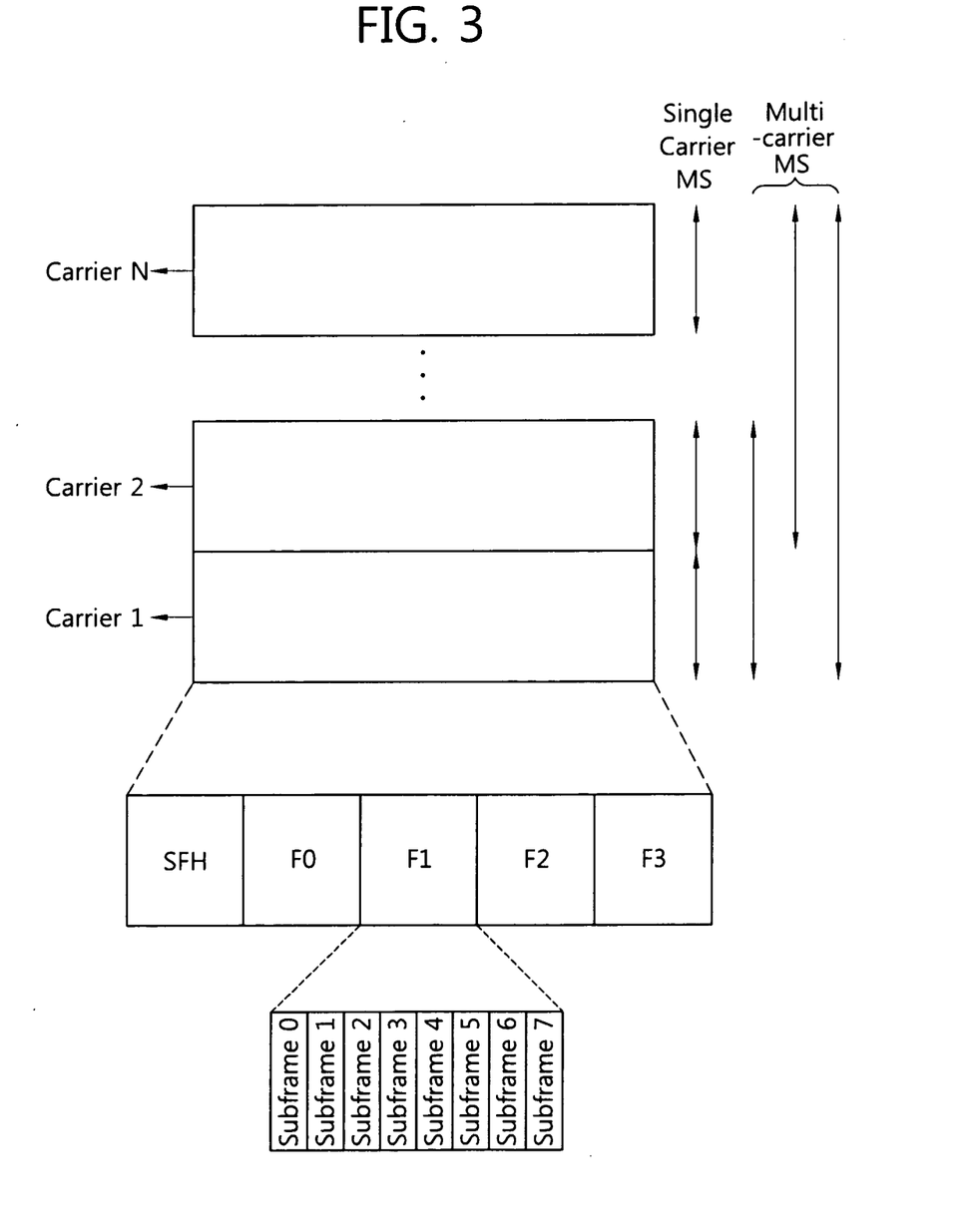
FIG. 3 shows an example of a frame structure for a multiple carrier operation.

FIG. 3 shows an example of a frame structure for a multiple carrier operation. A superframe consists of four radio frames F0, F1, F2, and F3. Each radio frame consists of 8 subframes. The subframe includes a plurality of OFDM symbols. A superframe header (SFH) is located in a first subframe in the superframe. Each carrier can have its own SFH. A certain carrier may have only a part of the SFH. Multiple carriers may be contiguous to one another, or may not be contiguous to one another. An MS can support one or more carriers according to capability of the MS.

The SFH is transmitted through a broadcast channel, and transmits necessary system parameters and system information. The system information includes code information used in a current cell or a neighbor cell and a variety of information regarding a radio environment such as a power level, etc. The MS has to receive system information of a BS having a coverage to which the MS belongs, when the MS is initially registered to a BS system or when the MS is handed over to a new BS. The MS can know a state of the BS by using the system information, and can know an access mechanism and procedure when accessing the BS.

The SFH includes a primary SFH (P-SFH) and a secondary SFH (S-SFH). The P-SFH is included in a first frame of each superframe, and is configured by the following table.

TABLE 1

| Syntax | Size (bit) |
|---|---|
| LSB of Superframe Number | 4 |
| S-SFH Change Count | 4 |
| S-SFH Size | 4 |
| S-SFH Transmission Format | 2 |
| S-SFH Scheduling Information bitmap | 3 |
| S-SFH SP Change Bitmap | 3 |
| Reserved | 4 |

The P-SFH is included in every superframe, and indicates whether a current superframe includes the S-SFH, an update number of system information supported in the current superframe, etc.

The S-SFH is divided into three types of S-SFH sub-packets (S-SFH SP) according to its characteristic. Each S-SFH sub-packet is used to broadcast a plurality of pieces of system information to the MS. The system information must be known to the MS in order to access the BS. For example, a format of an S-SFH SP1 IE is as follows. For this, "Part 16: Air Interface for Fixed and Mobile Broadband Wireless Access Systems" of IEEE 802.16m-09_0010R2 can be incorporated herein by reference.

TABLE 2

| Syntax | Size (bit) | Notes |
|---|---|---|
| UL permutation configuration (CRU, DRU partitioning and signaling related to that) | [22] | UL_CAS_SB0(4), UL_CAS_MB0(6), UL_CAS_SBi (4 × 3) (Up to 22 bits, Need the decision from UL physical structure section) |
| Initial ranging channel information (initial ranging region location) | TBD | (Need the decision from UL Ctrl section) |
| RNG codes information | 12 | Parameters for determining the root sequences and their cyclic shifts in the preamble set for the cell (Up to 12 bits, Need the decision from UL Ctrl section) |
| HO ranging codes | 6 | 64 RNG codes (Need the decision from UL Ctrl section) |

TABLE 2-continued

| Syntax | Size (bit) | Notes |
| --- | --- | --- |
| HO Ranging backoff start | 4 | Initial backoff window size for HO ranging contention, expressed as a power of 2. Values of n range 0-15 (the highest order bits shall be unused and set to 0) (Need the decision from UL Ctrl or MAC operation section) |
| HO Ranging backoff end | 4 | Final backoff window size for HO ranging contention, expressed as a power of 2. Values of n range 0-15 (the highest order bits shall be unused and set to 0) (Need the decision from UL Ctrl or MAC operation section) |
| BS EIRP | 16 | Signed in units of 1 dBm |
| Cell bar information | 1 | If Cell Bar bit = 1, this cell is not allowed for any new initial entry |
| Reserved | TBD | |
| } | | |

Referring to Table 2, the S-SFH SP1 IE includes 1-bit cell bar information. The cell bar information is also referred to as a cell bar bit (CBB). If the CBB is 1, it indicates that a corresponding cell does not allow initial entry of a new MS. In case of a single carrier system, one carrier is provided to one cell, and thus if the CBB is 1, it indicates that entry into the cell is not allowed. On the other hand, in case of a multiple carrier system, a plurality of carriers are provided to one cell, and since the CBB can be individually configured for each carrier, if the CBB is 1, it indicates that communication cannot be performed through a specific carrier.

Hereinafter, a method of transmitting broadcast information in a multiple carrier system according to the present invention will be described. Broadcast information is information that must be received by all MSs according to a characteristic of the information. Therefore, the broadcast information has to be transmitted through all carriers in principle in case of using the multiple carrier system. However, if the broadcast information is transmitted for a case where there is no MS in a cell, or where the MS cannot enter the cell, or where a BS and the MS cannot communicate with each other through a specific carrier, a limited radio resource is wasted and system performance deteriorates. Accordingly, there is a need for a method capable of selectively transmitting the broadcast information in the multiple carrier system.

Figure 4:
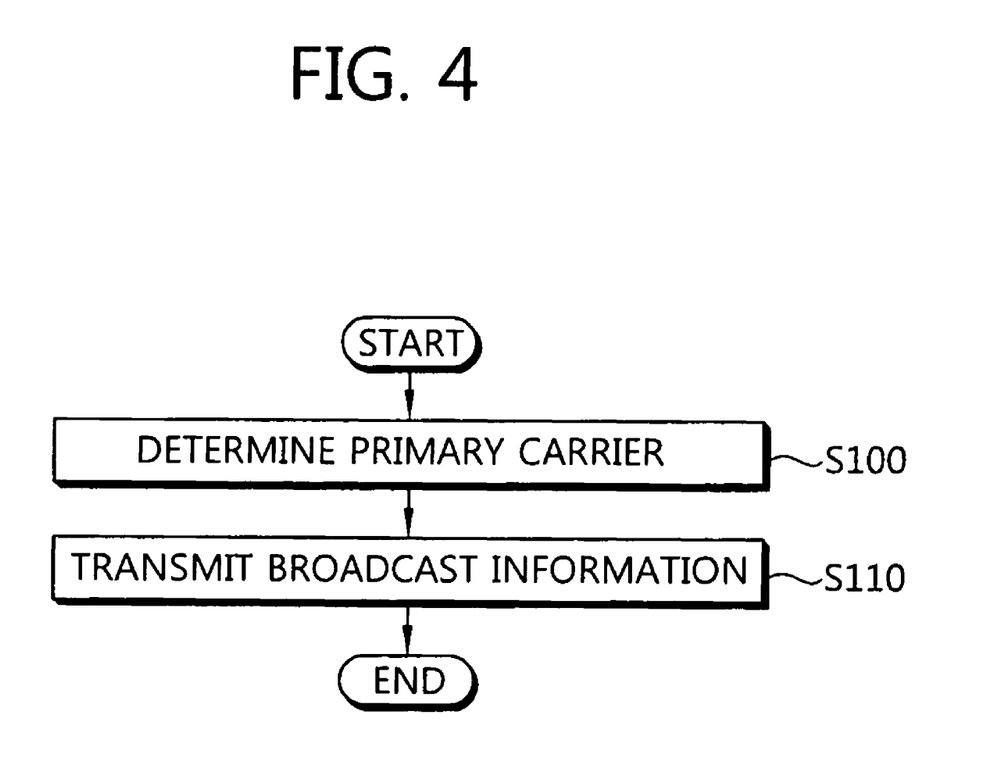
FIG. 4 is a flowchart showing a method of selectively transmitting broadcast information according to an embodiment of the present invention.

FIG. 4 is a flowchart showing a method of selectively transmitting broadcast information according to an embodiment of the present invention.

Referring to FIG. 4, a BS configures a superframe for an operation of multiple carriers, and determines at least one of a plurality of candidate carriers as a primary carrier (step S100). Herein, the candidate carrier refers to a carrier that can be used later as a primary carrier of an MS, the primary carrier refers to a carrier capable of transmitting data and a control message between the MS and the BS, and a carrier other than the primary carrier refers to a carrier for transmitting only the data. The primary carrier can be relatively determined for each MS. For example, a second carrier may be a primary carrier in a first MS, and a first carrier may be the primary carrier in a second MS. There are two methods of determining the primary carrier, i.e., 1) a method of determining the primary carrier by using a CBB and 2) a method of determining the primary carrier according to a condition of the MS. Details thereof will be described below with reference to FIG. 5. The BS transmits broadcast information through the determined primary carrier (step S110).

Figure 5:
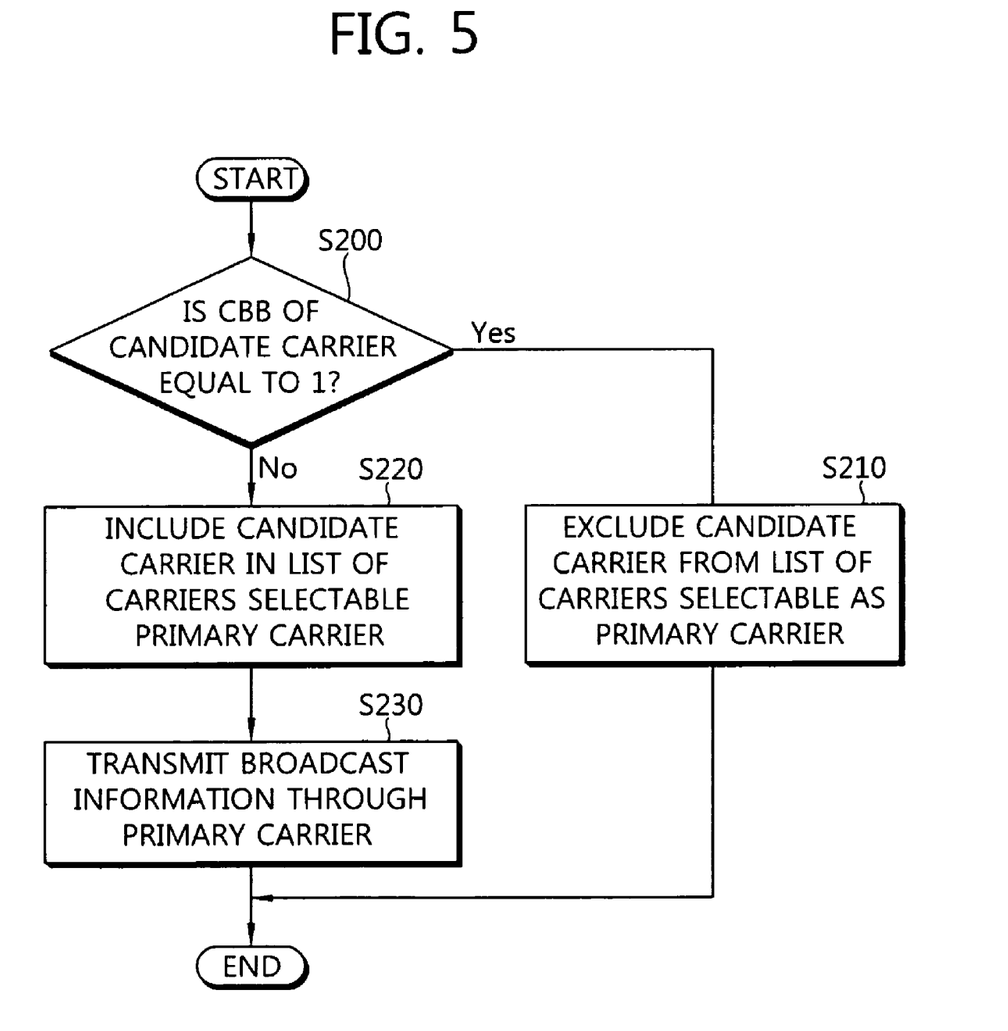
FIG. 5 is a flowchart showing a method of determining a primary carrier according to an embodiment of the present invention.

FIG. 5 is a flowchart showing a method of determining a primary carrier according to an embodiment of the present invention. In this method, the primary carrier is determined by using a CBB.

Referring to FIG. 5, a BS determines whether the CBB of a candidate carrier is 1 (step S200). The CBB is information included in an S-SFH SP1 IE. If the CBB is 1, the BS excludes the candidate carrier from a list of carriers that can be selected as the primary carrier (step. S210). If the CBB is not 1, the BS allows the candidate carrier to be included in the list of carriers that can be selected as the primary carrier (step S220). Thereafter, the BS transmits broadcast information through the determined primary carrier (step S230).

Herein, if n is the total number of candidate carriers, the BS repeats the aforementioned procedure on the n candidate carriers. If the number of candidate carriers determined as a carrier to be selected as the primary carrier as a result of repeating the procedure is i (where i≦n), the broadcast information may be transmitted through all of the i candidate carriers, or j candidate carriers (where j<1) may be selected from them and then can be used as the primary carrier. Once a candidate carrier of which a CBB is not 1 is determined, which candidate carrier will be used as the primary carrier is a matter of implementation.

Figure 6:
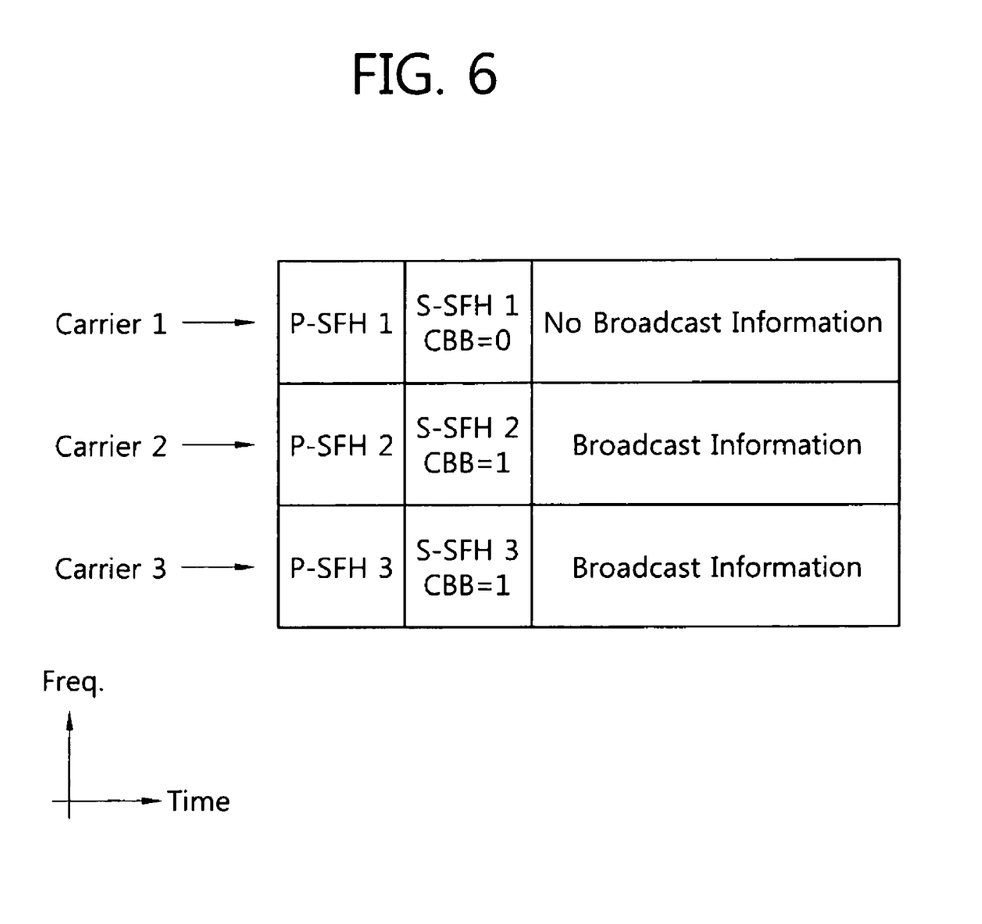
FIG. 6 is a diagram for showing a method of transmitting broadcast information through a primary carrier determined by using a cell bar bit (CBB).

FIG. 6 is a diagram for showing a method of transmitting broadcast information through a primary carrier determined by using a CBB.

Referring to FIG. 6, a BS performs communication with an MS by using candidate carriers 1, 2, and 3 in a superframe structure. Although it is shown herein that the candidate carriers 1, 2, and 3 are contiguous to one another, this is for exemplary purposes only, and thus the respective candidate carriers can be spaced apart by a specific frequency interval. The candidate carrier 1 transmits a P-SFH 1 and an S-SFH 1. The candidate carrier 2 transmits a P-SFH 2 and an S-SFH 2. The candidate carrier 3 transmits a P-SFH 3 and an S-SFH 3. Since a CBB of the carrier 1 is 1, broadcast information is not transmitted. Since a CBB of the remaining carriers 2 and 3 is 0, the broadcast information can be transmitted. The BS can determine any one or all of the carriers 2 and 3 as the primary carrier.

That is, the BS transmits the broadcast information through a specific carrier instead of all candidate carriers. The specific carrier is determined by a CBB included in an S-SFH. If the CBB is set to 1, the MS can perform initial entry through a corresponding carrier. When the MS transmits the broadcast information through a carrier through which initial entry is not allowed, it is waste of resources. Thus, the BS does not transmit the broadcast information through a carrier of which a CBB is 1, and transmits the broadcast information through a carrier of which a CBB is not 1, thereby effectively using radio resources.

Even if the CBB is set to 1, broadcast information for changing a configuration can be transmitted. In this case, the broadcast information is not transmitted when a timer expires by setting a time for transmitting the broadcast information to an MS currently receiving a service through a corresponding carrier, or when the BS recognizes that all MSs successfully receive the broadcast information.

It has been described that initial entry of the MS is not allowed if the CBB is set to 1. However, this is for exemplary purposes only, and thus the CBB set to 1 may indicate the other way around (i.e., indicates that initial entry is allowed). Further, the number of bits of the CBB is not necessarily a 1 bit, and thus the number of bits may increase according to a system environment.

Figure 7:
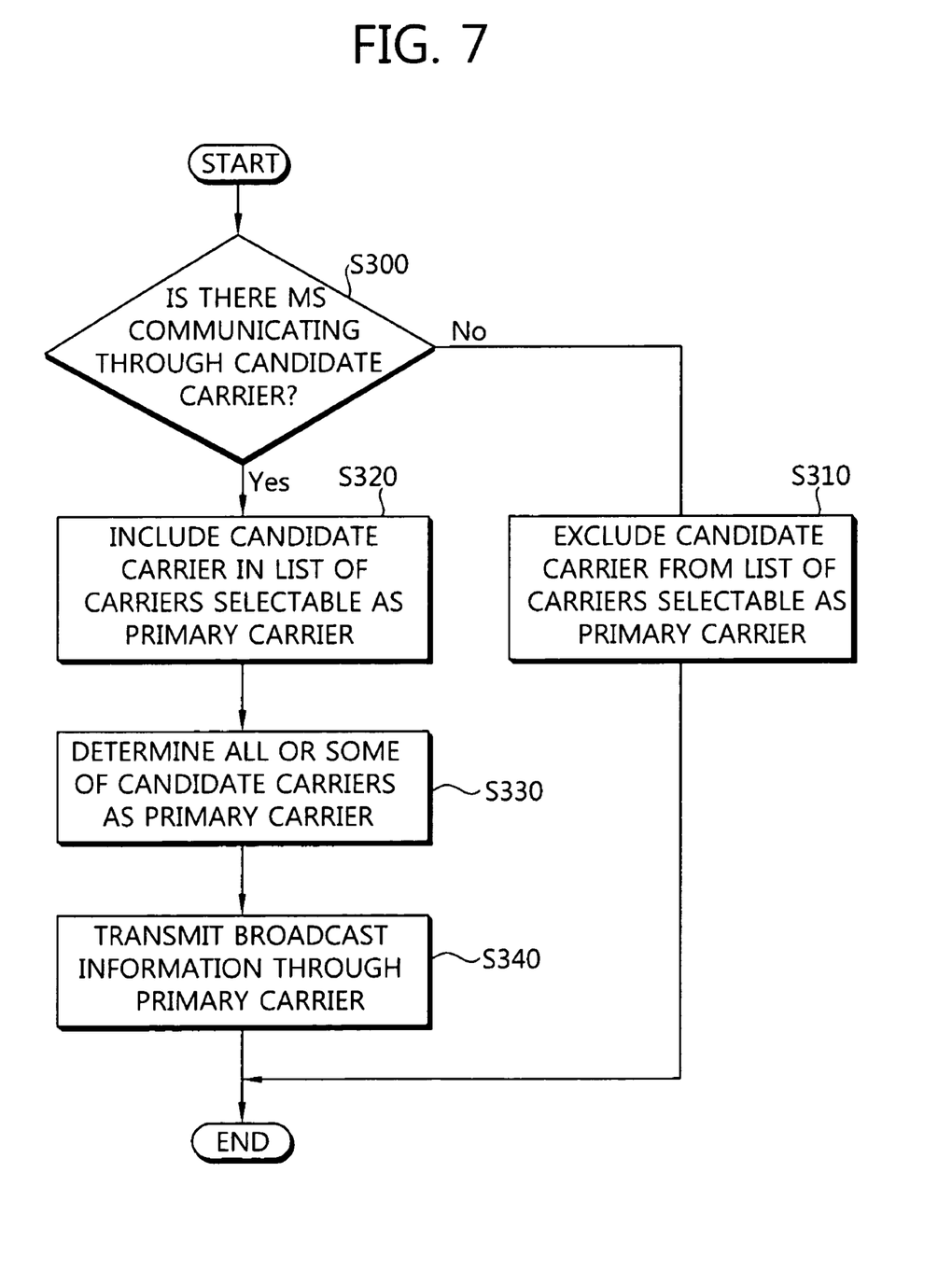
FIG. 7 is a flowchart showing a method of determining a primary carrier according to another embodiment of the present invention.

FIG. 7 is a flowchart showing a method of determining a primary carrier according to another embodiment of the present invention. In this method, the primary carrier is determined by using a condition of an MS.

Referring to FIG. 7, a BS determines whether there is an MS that performs communication through a candidate carrier (step S300). Herein, performing of communication with the MS implies that communication with the MS is achieved by using a radio resource of a corresponding carrier irrespective of whether communication is performed in an uplink or a downlink or whether communication is performed for data or control information. For example, in case of a single carrier system, if the MS does not exist in a cell, the MS performing communication through the corresponding carrier does not exist.

If the MS performing communication through the candidate carrier does not exist, the BS excludes the candidate carrier from a list of carriers that can be selected as the primary carrier (step S310). If there is at least one MS performing communication through the candidate carrier, the BS allows the candidate carrier to be included in the list of carriers that can be selected as the primary carrier (Step S320). Further, optionally, the BS determines all or only some of candidate carriers, which are included in the list of carriers that can be selected as the primary carrier, as the primary carrier (step S330), and transmits broadcast information through the determined primary carrier (step S340).

A case of determining only some of the candidate carriers, which are included in the list of carriers that can be selected as the primary carrier, as the primary carrier is as follows. For example, when a primary carrier for a large number of MSs is a first primary carrier and a primary carrier for a small number of MSs is a second primary carrier, even if the small number of MSs perform communication through the second primary carrier, the broadcast information must be transmitted through the second primary carrier. In this case, the BS may change the primary carrier for the small number of MSs to the first primary carrier. Unlike the aforementioned example, the primary carrier for the large number of MSs may be changed from the first primary carrier to the second primary carrier. Since this is a matter of implementation, it may differ according to whether a priority will be determined in terms of efficiency of radio resources or in terms of reliability of communication between the BS and the MS.

Even if the CBB is set to 1, broadcast information for changing a configuration can be transmitted. In this case, the broadcast information is not transmitted when a timer expires by setting a time for transmitting the broadcast information to an MS currently receiving a service through a corresponding carrier, or when the BS recognizes that all MSs successfully receive the broadcast information.

Although a series of steps or blocks of a flowchart are described in a particular order when performing methods in the aforementioned exemplary system, the steps of the present invention are not limited thereto. Thus, some of these steps may be performed in a different order or may be concurrently performed. Those skilled in the art will understand that these steps of the flowchart are not exclusive, and that another step can be included therein or one or more steps can be omitted without having an effect on the scope of the present invention.

The aforementioned embodiments include various exemplary aspects. Although all possible combinations for representing the various aspects-cannot be described, it will be understood by those skilled in the art that other combinations are also possible. Therefore, all replacements, modifications and changes should fall within the spirit and scope of the claims of the present invention.

What is claimed is:

1. A method of transmitting broadcast information by using multiple carriers, the method comprising:
    configuring a superframe for an operation of the multiple carriers; and
    transmitting the broadcast information through at least one primary carrier selected from the multiple carriers using cell bar information included in the superframe, and
    wherein the superframe is configured by a base station to include a primary superframe header (P-SFH) and a secondary superframe header (S-SFH), and the S-SFH includes the cell bar information indicating whether initial cell entry of a mobile station is allowed, and the base station selects one of the multiple carriers as the primary carrier, and
    wherein, if the cell bar information indicates that the initial cell entry is not allowed, a carrier corresponding to the cell bar information is not selected as the primary carrier.

2. The method of claim 1, wherein the primary carrier is a carrier capable of transmitting data or control information, and the remaining carriers other than the primary carrier is a carrier capable of transmitting only the data.

3. The method of claim 1, wherein the cell bar information is individually configured for each of the multiple carriers.

4. The method of claim 3, wherein, if the cell bar information indicates that the initial cell entry is allowed, a carrier corresponding to the cell bar information is selected as the primary carrier.

5. The method of claim 1, wherein the primary carrier is used when at least one mobile station performs communication.

6. The method of claim 1, wherein the primary carrier can be changed to a different carrier, and the cell bar information corresponding to the different carrier indicates that the initial cell entry is allowed.

7. The method of claim 1, wherein the primary carrier can be changed to a different carrier, and the different carrier is used when at least one mobile station performs communication.

8. The method of claim 1, wherein the information contained in the superframe enables the primary carrier to be indicated as a candidate among the multiple carriers for the transmitting of the broadcast information.

9. A method of transmitting broadcast information by using multiple carriers, the method comprising:
    determining a primary carrier to transmit the broadcast information by using cell bar information; and transmitting the broadcast information through the determined primary carrier selected among the multiple carriers, and wherein the cell bar information is included in a frame and individually configured for each of the multiple carriers, and the cell bar information corresponding to the primary carrier indicates that initial cell entry is allowed to cause the primary carrier to be selected as a candidate to implement the transmitting, and a base station selects one of the multiple carriers as the primary carrier, and wherein, if the cell bar information indicates that the initial cell entry is not allowed, a carrier corresponding to the cell bar information is not selected as the primary carrier.

10. The method of claim 9, wherein the cell bar information is included in a secondary superframe header in a superframe for an operation of the primary carrier.

* * * * *